May 30, 1944.    L. B. NEIGHBOUR ET AL    2,349,911
WAGON DUMP
Filed Sept. 5, 1940    4 Sheets-Sheet 1
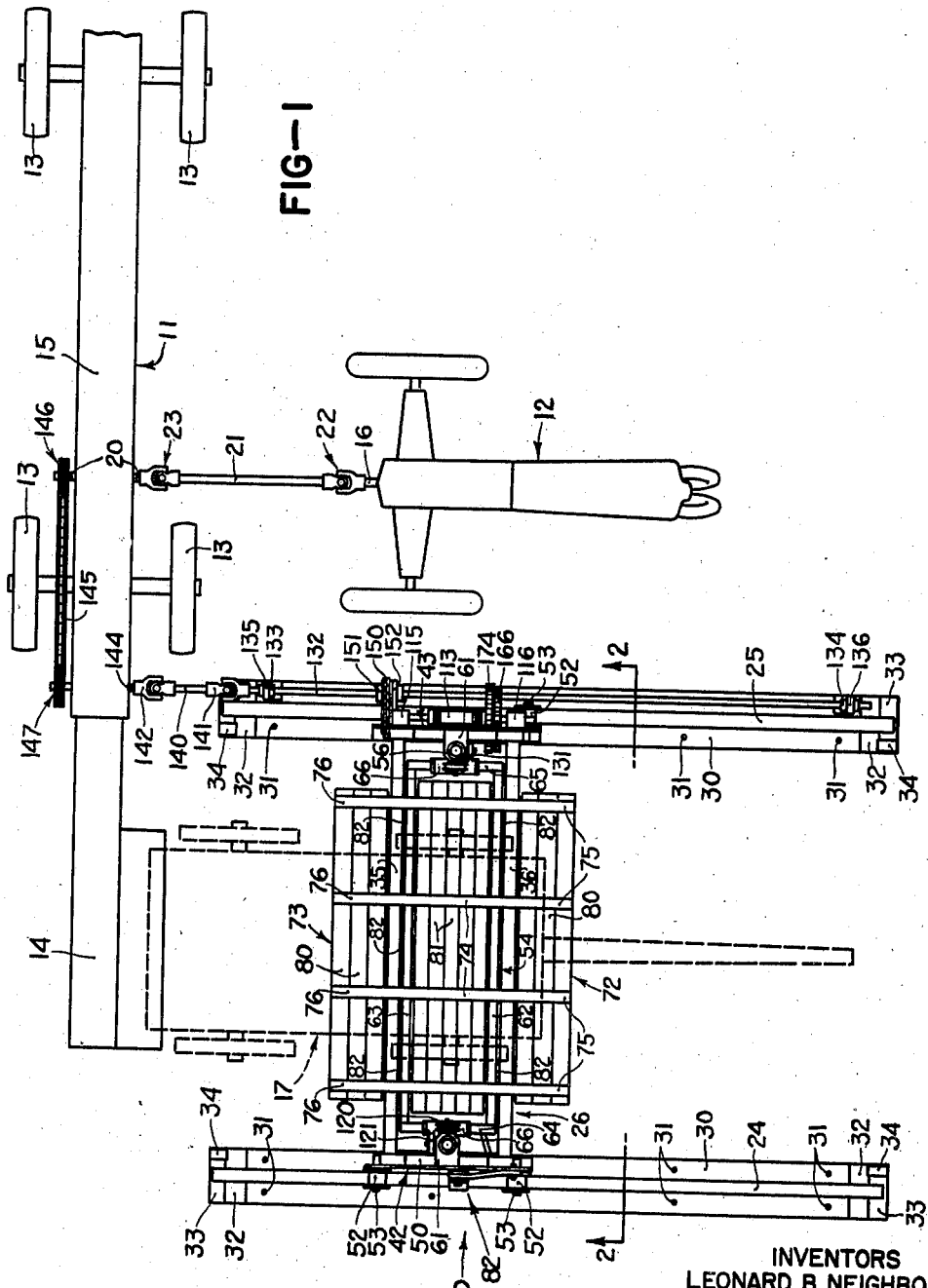
INVENTORS
LEONARD B. NEIGHBOUR
FRANK T. COURT
BEN R. HAVERSTICK
ATTORNEYS.

May 30, 1944.    L. B. NEIGHBOUR ET AL    2,349,911
WAGON DUMP
Filed Sept. 5, 1940    4 Sheets-Sheet 2
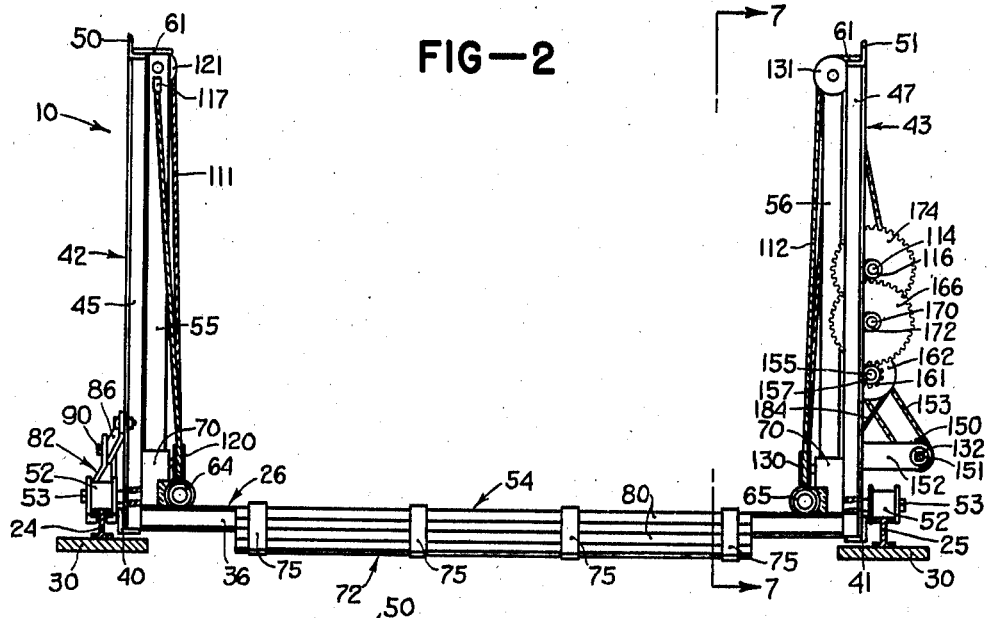
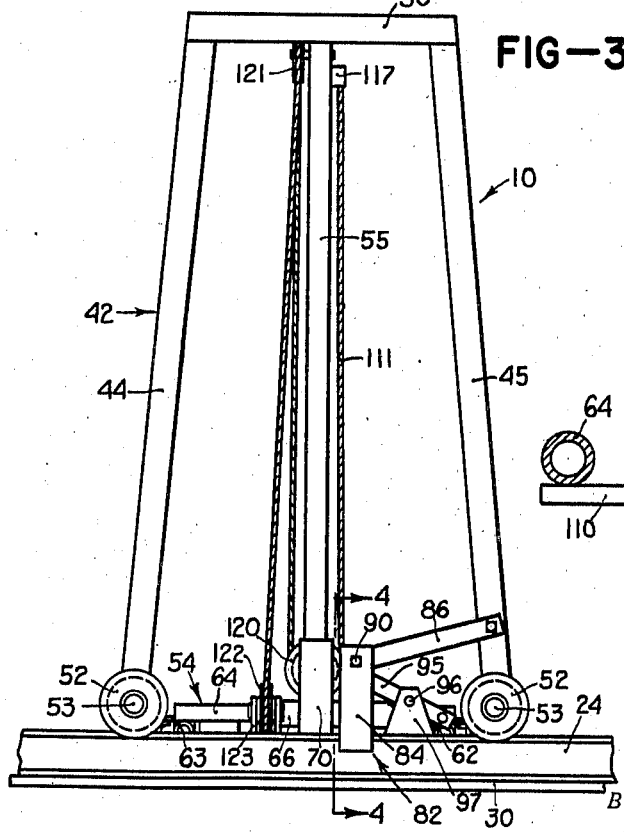
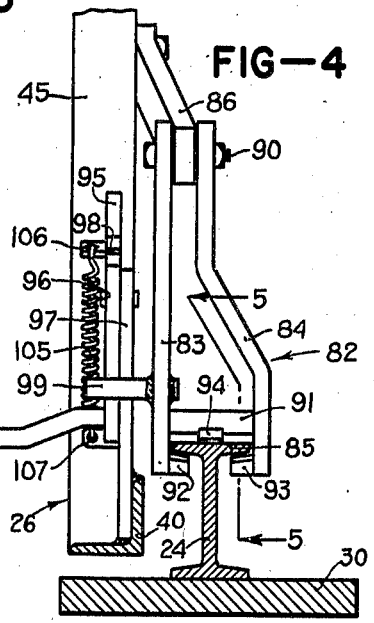
INVENTORS
LEONARD B. NEIGHBOUR
FRANK T. COURT
BEN R. HAVERSTICK
ATTORNEYS.

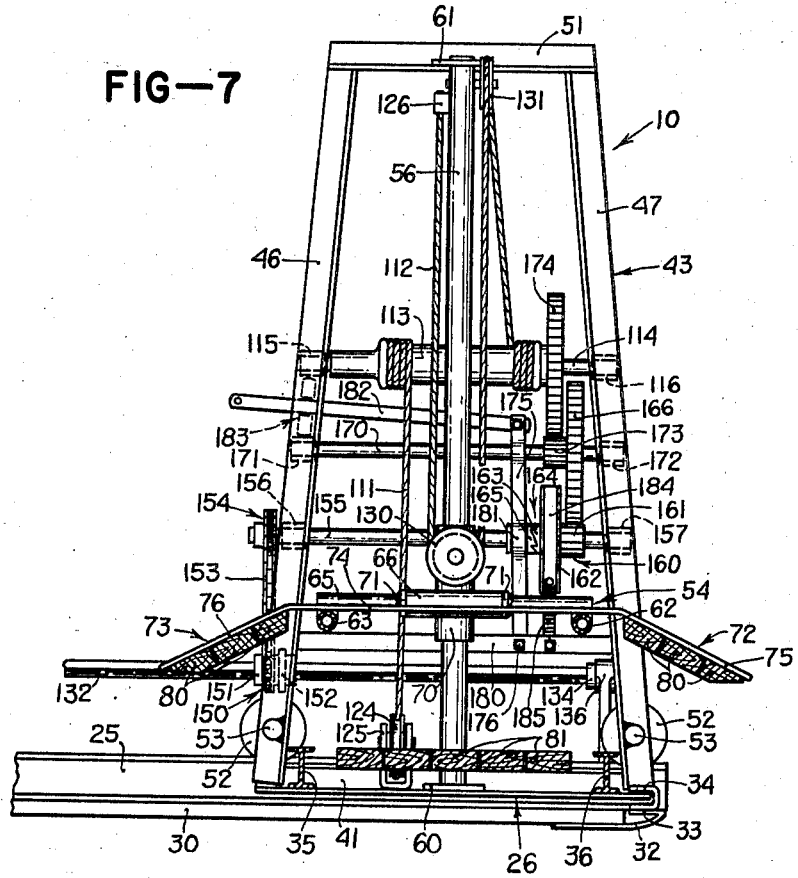

Patented May 30, 1944

2,349,911

UNITED STATES PATENT OFFICE 2,349,911

WAGON DUMP

Leonard B. Neighbour and Frank T. Court, Moline, and Ben R. Haverstick, Rock Island, Ill., assignors to Deere & Company, Moline, Ill., a corporation of Illinois Application September 5, 1940, Serial No. 355,474

15 Claims. (Cl. 214—46.5)

The present invention relates to agricultural implements and is more particularly concerned with wagon dumps of the type used to raise the front wheels of a wagon so that the grain carried thereby is emptied by gravity through the tail gate of the wagon. Wagon dumps of this nature are principally used to unload ear corn from field wagons into the hoppers of grain elevators where the grain is elevated into cribs or bins, and consequently it is desirable that the wagon dump be portable so that it can be moved from one crib to another as the cribs fill up. It is also desirable that the wagon dump be adapted to accommodate wagons of various wheel bases without necessitating moving the dump or the elevator hopper.

With the above in view, it is the principal object of the present invention to provide a new and improved portable wagon dump that can be quickly and easily moved from place to place as the occasion demands, and that is adapted to accommodate a wide range of wagon wheel bases. In the accomplishment of this object we provide a pair of rails which are normally staked down to the ground in spaced parallel relation extending away from the elevator hopper, and a platform mounted to travel along the rails. A vertically movable cradle is carried by the platform, which engages the front wheels of the wagon to raise the same, and the platform and cradle are moved toward or away from the hopper to accommodate short or long wheel base wagons, respectively, without moving the tail gate of the wagon away from the elevator hopper.

A further object of our invention is to provide means for securely locking the platform to the rails in such a manner that the rails and platform can be moved bodily from place to place with the rails maintained at the proper gauge by the flanged wheels of the platform.

Another object is to provide a simple and improved braking device for preventing the platform from traveling along the rails when a wagon is being driven onto the lowered cradle, but which allows the platform to move freely along the rails while the cradle is being raised or lowered so as to accommodate the varying horizontal distance between the front and rear axles of the wagon as the wagon is tilted.

Still another object of the present invention is to provide novel means for driving the wagon dumping mechanism from the grain elevator or other source of power.

These and other objects and advantages of the present invention will become apparent to those skilled in the art after consideration of the following detailed description of a preferred embodiment thereof, reference being had to the accompanying drawings, in which Figure 1 is a top plan view of a wagon dump embodying the principles of our invention, illustrated in operating relation to a tractor-operated grain elevator and diagrammatically showing, in dotted lines, a wagon in position to be dumped;

Figure 2 is an enlarged front elevational view of the wagon dump, as taken along the section lines 2—2 of Figure 1;

Figure 3 is an enlarged elevational view of the left end of the wagon dump;

Figure 4 is an enlarged vertical section taken along the line 4—4 in Figure 3, showing the brake device in operative condition, as when the cradle is lowered to the ground;

Figure 5:
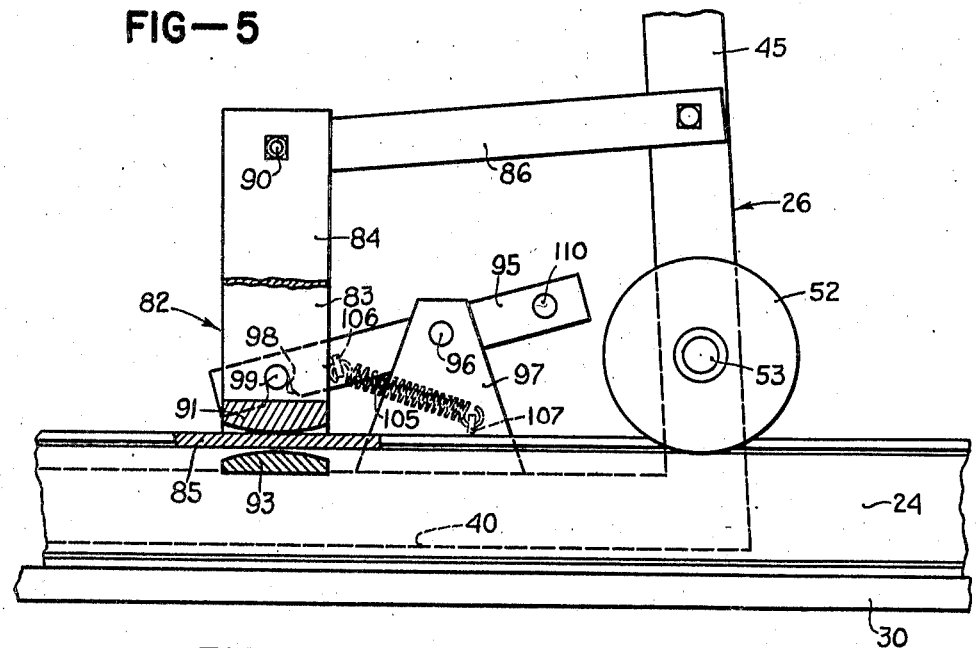
Figure 5 is an enlarged side view of the brake device, with a portion broken away substantially as indicated by the section line 5—5 in Figure 4 to show the arrangement of the brake shoes when the brake is disabled.
Figure 6:
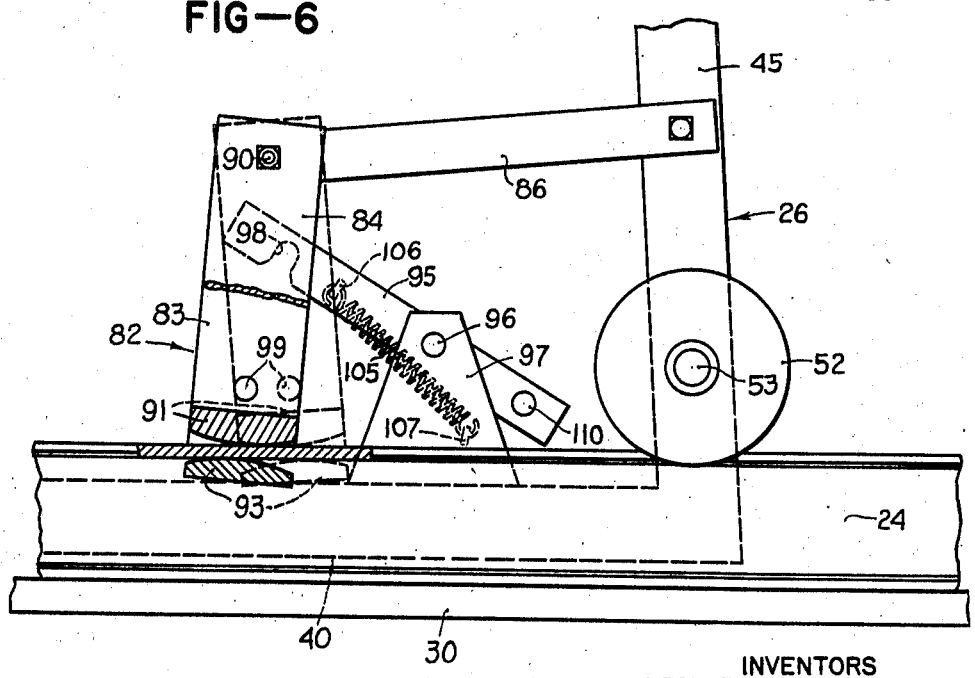

Figure 6 is a view similar to Figure 5, but showing the brake arm in rocked position, with the shoes gripping the rail to hold the platform against movement; and Figure 7 is an enlarged vertical section, taken substantially along the line 7—7 in Figure 2, but showing the cradle partially raised, and showing the manner in which the clips at the ends of the rails engage the platform to hold the same down onto the rails so that the rails and platform can be moved bodily as a unit, with the rails maintained at proper gauge by the flanged wheels of the platform.

Referring now to the drawings, the wagon dump is indicated in its entirety by the reference numeral 10 and, as illustrated in Figure 1, is adapted to be used in conjunction with a portable grain elevator, indicated generally by the reference numeral 11, which may be driven from a tractor 12 or other suitable source of power. The grain elevator 11 is mounted on supporting wheels 13 and includes a hopper 14 which is positioned to receive the grain as it falls by gravity from the tail gate of a wagon 17. The grain which is emptied into the hopper 14 flows by gravity or is conveyed by suitable conveying mechanism to the elevating section 15 and is carried up these sections by the usual conveyor belt or buckets (not shown).

Power for operating the grain elevator 11 is derived from the tractor power take-off shaft 16 and is transmitted to the drive shaft 20 through a shaft 21 and universal joints 22, 23.

The wagon dump 10 comprises a pair of laterally spaced parallel rails 24 and 25 which are placed on the ground on either side of the hopper 14 with one end adjacent the hopper, and a carriage or platform 26 which is mounted to travel along the rails. Each of the rails 24, 25 is fixed in any suitable manner to the top surface of a broad plank 30 which provides ample bearing surface to support the weight of the rail and platform on soft ground. Suitable holes 31 are provided at intervals along the planks 30 through which stakes may be driven to hold the rails securely in place on the ground. Upwardly curved skids or runners 32 are fixed to the bottoms of the planks 30 at the ends thereof and are bent backwardly, as at 33, and welded to the bottoms of their respective rails 24, 25 (see Figure 7). U-shaped clips 34 are fixed to the backwardly bent portion 33 of the skids 32 on the inside of the rails 24, 25 with their open ends facing toward the longitudinal mid-point of the rails, the purpose of these clips 34 being to engage the platform and hold it down onto the rails when the wagon dump is being moved from one location to another, as will be described in more detail presently.

The platform or carriage 26 consists of a rectangular frame made up of a pair of longitudinally spaced I beams 35 and 36 extending transversely between the rails 24, 25 and joined together at their ends by angle iron cross members 40 and 41. Vertical end frames 42 and 43 are provided at each end of the platform frame, and these consist of angle iron posts 44, 45, and 46, 47, respectively, which are fixed to the ends of their respective cross members 40, 41 and extend upwardly therefrom in converging relation. The upper ends of the posts 44, 45 are joined by a cross piece 50, and posts 46, 47 have a like cross piece 51.

The platform 26 is mounted on supporting wheels 52 which are flanged to engage both sides of the rails 24, 25, and these wheels are journaled on axles 53 which extend through and are welded to the vertical posts 44, 45, 46, 47, near their lower ends. The dumping mechanism for raising the front ends of the grain laden wagons comprises a cradle 54 which is carried by the platform 26 and is movable vertically relative thereto along vertical guide pipes 55 and 56. Each of the pipes 55, 56 is fixed at its lower end to a plate 60 (see Figure 7) which is welded to its respective cross member 40, 41, at the mid-point thereof, and is secured at its upper end to a plate 61 which is welded to the corresponding cross piece 50, 51. The cradle 54 comprises a pair of transversely extending tubular members 62 and 63 joined together at their ends by fore and aft extending tubular members 64 and 65, to form a rectangular frame which is adapted to fit down into the frame of the platform when the cradle is lowered. The tubular end member 65 at the right end of the cradle 54 extends tnrough and is journaled for rotation in a sleeve 66 which is welded to a vertical sleeve 70 slidably mounted on the vertical guide pipe 56. Annular rings or washers 71 are welded to the member 65 abutting the ends of the sleeve 66 in the manner of end thrust bearings so as to prevent relative axial movement between the member 65 and sleeve 66 (see Figure 7). The tubular end member 64 at the left end of the cradle is also provided with a guide similar to that described for the right end of the cradle, and like parts are given the same reference numerals. From the foregoing, it is seen that the cradle 54 is prevented by the guide sleeve 70 from tilting a fore and aft direction but is free to tilt laterally without binding on the pipes 55, 56 in the event that one end of the cradle drops below the other end. It is to be noted, however, that the lifting mechanism is designed to exert a uniform lift on both ends of the cradle, so that lateral tilting of the cradle will be experienced only under extreme conditions, as when one of the lifting cables has stretched slightly more than the other.

When a wagon is to be dumped, it is backed up over the platform 26 and cradle 54 until the tail gate of the wagon is directly over the hopper 14, and the front wheels of the wagon come between the transverse cradle members 62, 63. To facilitate backing the wagon wheels over the platform, which is necessarily at some height above the ground, the wagon dump is provided with inclined ramps 72 and 73, which, in the preferred embodiment, comprise a plurality of steel straps or bars 74 extending across the top of the cradle and platform beams 35, 36, and having the end portions thereof bent downwardly at 75 and 76 to reach the ground. Heavy wood planks 80 are bolted or otherwise secured to the undersides of the end portions 75, 76, and the bars 74 are fixed to the cradle members 62, 63 so that the ramps 72, 73 are raised and lowered with the cradle. Planks 81 are also provided between the platform beams 35, 36, and these planks lie across and are secured to three cross beams 82 (see Figure 1) which, in turn, rest upon the bottom flanges of the I beams 35, 36. Clearance is provided between the outer edges of the planks 81 and the beams 35, 36, to receive the tubular cradle members 62, 63 when the cradle is lowered, so that the tops of the planks 81, cradle members 62, 63, and platform beams 35, 36 are substantially flush, affording a relatively smooth runway over which the wagon wheels may be driven.

As the wagon is driven against the ramps 72, 73, there is a tendency for the wheel supported platform 26 to move along the rails 24, 25 away from the wagon wheels, and this tendency is resisted by a braking device indicated in its entirety by the reference numeral 82, which engages the left hand rail 24 to prevent such movement. The brake 82 comprises a vertical arm made up of two bars 83 and 84 which are spaced apart laterally at their lower ends to receive the horizontal top flange 85 of the rail 24. The outer bar 84 is bent toward the inner bar 83, and their upper ends are separated by a supporting arm 86, to which the bars 83, 84 are joined by a pivot bolt 90. The arm 86 extends toward and is bolted to the vertical member 45 of the left end frame 42.

Fixed to the lower ends of the bars 83, 84 is an upper brake shoe 91 and two lower shoes 92 and 93 which are spaced so as to bear against the top and bottom surfaces of the rail flange 85 adjacent the outer edges thereof. The upper brake shoe 91 extends across the width of the rail flange and is fixed to both bars 83, 84. The bottom surface of the shoe 91 has a downwardly convex curve along the line of the rail, as best shown in Figures 5 and 6, and is recessed at 94 to insure contact along the outer edges of the rail flange 85. The two lower shoes 92, 93 are disposed on opposite sides of the web of the rail 24, and each shoe is fixed to and extends laterally inwardly from one of the bars 83, 84. The lower shoes 92, 93 are both curved to present upwardly convex bearing surfaces which are adapted to engage the bottom of the rail flange when the brake arm is rocked, as shown in Figure 6. The upper and lower shoes at their closest point are spaced apart a distance greater than the thickness of the flange 85, and the upper shoe 91 normally rests on the top of the rail flange so that any movement of the platform causes the lower ends of the brake arm to drag along the rail and to rock on the curved surface of the shoe about the pivot bolt 90 as an axis to one of the inclined positions shown in Figure 6. In the drawings, the solid line representation of the brake arm indicates the position assumed by the arm when the platform tends to move toward the right, while the broken lines indicate the position assumed when the platform tends to move toward the left. This rocking movement of the brake arm about the pivot bolt 90 causes the brake shoes to grip the rail flange 85 firmly between them, thereby locking the platform against further movement along the rails.

As the cradle is raised with the front wheels of a wagon, however, the platform should be free to move along the rails to accommodate the shortened horizontal distance between the front and rear axles of the wagon, and to this end we have provided means operative to disable the brake device 82 after the cradle has been raised an appreciable distance. In the preferred embodiment of our invention, such brake disabling means is in the form of a lever 95 which is pivoted intermediate of its ends for vertical swinging about a pivot bolt 96 fixed to a generally triangular plate 97 which is welded to the platform member 40 adjacent the brake arm. One end of the lever 95 is provided with a flared notch 98 which is adapted to engage a pin 99 fixed to and extending laterally inwardly from the brake arm bar 83. A spring 105 fastened to a lug 106 on the lever 95 and anchored to a second lug 107 on the plate 97, yieldingly urges the lever down into engagement with the pin, thereby holding the brake arm perpendicular to the rail 24. With the brake arm thus prevented from rocking to either of the inclined locking positions, the platform 26 is free to travel along the rails in either direction. The holding lever 95 is disabled when the cradle is lowered to the bottom of the guide pipes 55, 56 by means of a pin or rod 110 which is fixed to the end of the lever opposite the notch 98 and extends laterally inwardly therefrom to a point beneath the cradle end member 64. As the cradle approaches lowered position, the member 64 contacts and bears downwardly on the pin 110, swinging the lever 95 up to the position shown in Figures 4 and 6, thereby releasing the brake arm 82 for operation.

The cradle 54 is raised and lowered along the guide pipes 55, 56 by means of cables or ropes 111 and 112, which are trained over sheave wheels and wound up on a winding drum 113. The winding drum 113 is mounted on a shaft 114 which is journaled in bearings 115 and 116 fixed to the vertical members 46, 47 at the right end of the platform. Cable 111 is anchored to the upper end of the left hand guide pipe 55 by means of a clip 117, and extends downwardly therefrom and is trained over a pulley 120 journaled on the cradle guide sleeve 70. The cable 111 then passes upwardly over a sheave wheel 121 journaled at the upper end of the pipe 55, and downwardly again around a sheave wheel 122 which is rotatably supported by a bracket 123 mounted on the platform cross member 40. From the sheave wheel 122 the cable 111 extends transversely across the width of the platform beneath the planking 81 and passes under a sheave wheel 124, which is supported between the arm of a U-shaped bracket 125 fixed to the right hand cross member 41. The cable 111 then extends upwardly to and is wound upon the winding drum 113 to which it is secured in any suitable manner.

The right hand end of the cradle is raised and lowered by cable 112 which is likewise secured to the upper end of the guide pipe 56 with a clip 126, and passes under a pulley 130 journaled on the cradle guide sleeve 70, then up over a sheave wheel 131 at the top of the pipe 56 and down to the winding drum 113 upon which it is wound.

The winding drum 113 is driven through a series of reduction gears from a tumbler shaft 132 of square cross section, which is disposed parallel to and adjacent the right hand rail 25. The ends of the tumbler shaft 132 are provided with round bearing portions 133 and 134 which are journaled in bearing support brackets 135 and 136, respectively, fixed to the plank 30 near the ends thereof. The end of the shaft 132 adjacent the elevator 11 is conected, by means of a shaft 140 and universal joints 141, 142, with a shaft 144 which is journaled on the elevator, and the shaft 144 is driven, in turn, from the elevator mechanism drive shaft 20 through a drive chain 145 and suitable sprockets at 146 and 147.

Power for turning the winding drum is taken from the tumbler shaft 132 by means of a sliding drive connection in the form of a sprocket 150 having a hub 151 provided with a square aperture which is adapted to slidably receive the square shaft 132. The sprocket 150 is journaled in a suitable bearing bracket 152 fixed to the platform member 146 and is held thereby against axial displacement. A drive chain 153 is trained over the sprocket 150 and around a second sprocket 154 fixed to the end of a shaft 155 journaled in bearings 156, 157, which are mounted on the end frame 43 of the platform.

Journaled on the end of the shaft 155 adjacent bearing 157 is a member, indicated in its entirety by the reference numeral 160, comprising a spur gear 161, brake drum 162, and the driven element 163 of a jaw clutch 164, joined together to rotate as a unit. The member 160 is connected with shaft 155 to rotate therewith through the clutch 164, the driving member 165 of which is keyed to the shaft for axial sliding movement into and out of engagement with driven member 163. Spur gear 161 is meshed with a large gear 166 fixed to a shaft 170 which is journaled in bearings 171 and 172 on the frame members 46 and 47. A spur gear 173 of small diameter is formed integral with the large gear 166, and is meshed with another large gear 174 fixed to the drum shaft 114. The gears 161, 166, 173, 174 provide a sufficiently slow speed of rotation for the drum 113 to enable the operator accurately to control the rate of flow of grain from the wagon 17 into the elevator hopper 14.

The clutch 164 is controlled by a lever 175 which is pivoted at 176 to a cross bar 180 fixed to the posts 46, 47. The lever 175 has a portion 181 which engages the sliding clutch member 165 to move the same into and out of engagement when the lever is swung in one direction or the other. A rod 182 is connected to the upper end of the lever 175 and extends rearwardly through a guide bracket 183 on the post 46 to a point within convenient reach of the operator standing by the rear end of the wagon 17.

A flexible brake band 184 is anchored at one end to the cross bar 180 and is wrapped around the brake drum 162 in frictional engagement therewith to provide braking means for holding the cradle in raised position when the clutch 164 is disengaged, and for controlling the speed at which the cradle is lowered by gravity. The other end of the brake band 184 is held by a tensional spring 185 which is fastened to the cross bar 180, so that the brake band is normally held under tension against the drum. Suitable connections (not shown) are provided for controlling the tension of the brake band 184 on the drum 162 through the clutch control lever 175 and bar 182, whereby the brake band is released from the drum when the clutch 164 is engaged, but engages the drum to a greater or lesser extent as the clutch lever 175 is moved to disengage the clutch, depending on the extent of movement of the lever. Such connections are old and well-known in the art, and further showing or description of the same is deemed unnecessary in this specification.

When the wagon dump 10 is to be moved from one location to another, the platform 26 is first moved to one end of the rails 24, 25 so that the horizontal flanges of the angle iron platform members 40, 41 slide under the top arms of the U-shaped clips 34, as shown in Figure 7. The platform 26 is thus held down by the clips 34 and is prevented from separating from the rails 24, 25. If the rails are staked down to the ground, the stakes are withdrawn from the holes 31 and a tow rope is passed through the sled runners 32 or secured to any other suitable part of the wagon dump. The wagon dump can then be towed to the new position with the planks 30 serving as skids, while the rails 24, 25 are maintained at the correct gauge by the flanges of the wheels 52.

It is believed that the operation and advantageous features of the present invention are clearly apparent from the foregoing, and what we claim and desire to secure by Letters Patent is:

1. A portable wagon dump comprising a pair of rails adapted to rest on the ground in parallel spaced relation, a platform having supporting wheels adapted to run on said rails, flange means on said wheels engageable with said rails to prevent transverse movement of the platform relative thereto, and means on said rails engageable with said platform for locking the same against vertical movement with respect to the rails, whereby said rails and said platform are held together during transportation of the wagon dump.

2. A portable wagon dump comprising a pair of rails adapted to rest on the ground in parallel spaced relation, a platform having supporting wheels adapted to run on said rails, said wheels being flanged to engage both sides of said rails, and a clip fixed to each of said rails adjacent one end thereof and engageable with said platform for holding the same down on the rails when the rails are moved, said wheels serving to hold the rails in properly spaced relation.

3. A wagon dump comprising a pair of laterally spaced parallel rails, a platform having supporting wheels running on said rails, a cradle carried by the platform and movable bodily therewith along the rails, said cradle being adapted to receive the front wheels of a wagon and being movable vertically with respect to the platform between a lowered position adjacent the ground and a raised dumping position, and means operative when the cradle is in lowered position but inoperative when the cradle has been raised a certain distance, for locking the platform to one of the rails.

4. A wagon dump comprising a pair of laterally spaced parallel rails, a platform having supporting wheels running on said rails, a cradle carried by the platform and movable bodily therewith along the rails, said cradle being adapted to receive the front wheels of a wagon and being movable vertically with respect to the platform between a lowered position adjacent the ground and a raised dumping position, means for locking said platform against movement along the rails when the cradle is in lowered position, and means operative to disable said locking means responsive to movement of the cradle to a certain elevation.

5. A wagon dump comprising a pair of laterally spaced parallel rails, a platform having supporting wheels running on said rails, a cradle carried by the platform and movable bodily therewith along the rails, said cradle being adapted to receive the front wheels of a wagon and being movable vertically with respect to the platform between a lowered position adjacent the ground and a raised dumping position, a brake carried by said platform and engageable with one of said rails when the cradle is in lowered position to hold the platform against movement along the rails, and means responsive to vertical movement of the cradle relative to the platform for disabling said brake so as to allow the platform to move freely along the rails when the wagon is being dumped.

6. A wagon dump comprising a pair of rails, a platform mounted on said rails for longitudinal movement thereon, a vertically movable cradle carried by said platform and movable bodily therewith, said cradle being adapted to engage and raise the front end of a wagon for dumping the same, braking means carried by the platform and engageable with one of said rails to hold the platform against movement thereon, a lever pivoted on the platform for swinging movement into and out of engagement with said braking means, said lever being operative to disable said braking means when in engagement therewith, and means on said lever engageable by said cradle when the latter is in lowered position for holding the lever out of engagement with the braking means.

7. A wagon dump comprising a pair of rails, a platform mounted on said rails for longitudinal movement thereon, a vertically movable cradle carried by said platform and movable bodily therewith, said cradle being adapted to engage and raise the front end of a wagon for dumping the same, a brake member pivoted on said platform and engageable with one of the rails to lock the platform against movement therealong, said brake member being swingable between a released position and a braking position, a pin fixed to said brake member, a lever pivoted on the platform and having a recess adapted to engage said pin to hold the brake member in released position, and means operative to swing said lever out of engagement with the brake member when the cradle is in lowered position and into engagement with the brake member when the cradle has been raised a predetermined distance.

8. A wagon dump comprising a pair of rails, a platform mounted on said rails for longitudinal movement thereon, a vertically movable cradle carried by said platform and movable bodily therewith, said cradle being adapted to engage and raise the front end of a wagon for dumping the same, a brake member pivoted on said platform and engageable with one of the rails to lock the platform against movement therealong, said brake member being swingable between a released position and a braking position, a pin fixed to said brake member, a lever pivoted on the platform and biased for movement toward said brake member, said lever having a recess adapted to engage said pin to hold the brake member in released position, and an arm fixed to the lever and engageable by said cradle when the latter is in lowered position to hold the lever out of engagement with the brake member pin.

9. In a wagon dump having a rail provided with a laterally extending flange, a platform mounted to travel on said rail, and a vertically movable cradle carried by said platform, a brake arm normally disposed perpendicular to the rail and having a pair of laterally extending shoes spaced apart vertically to receive said flange between them, said shoes at their closest point being spaced apart a distance greater than the thickness of said flange, pivot means connecting said arm to said platform for rocking movement in the vertical plane of the rail, one of said shoes having frictional engagement with said flange whereby the brake arm is rocked when the platform tends to move along the rail and said shoes grip the flange tightly to prevent further movement of the platform, means operative to hold said brake arm perpendicular to the rail when the cradle is raised, and means for disabling said holding means when the cradle is in lowered position.

10. In combination, a rail, a platform having a supporting wheel adapted to travel on said rail, a drive shaft supported for rotation about an axis parallel to the rail, a driving member journaled on said platform and having a sliding drive connection with said shaft, and dumping mechanism carried by said platform and driven from said driving member.

11. In combination with an elevator of the class described, a wagon dump comprising a pair of laterally spaced parallel rails, a platform mounted to travel on said rails, a vertically movable cradle carried by said platform, a drive shaft having a driving connection with the mechanism of said elevator, said shaft being supported for rotation about an axis parallel to said rails, mechanism on said platform for raising and lowering the cradle, means for driving said mechanism from said shaft including a member having a sliding drive connection with the shaft, and means for causing the drive connection to travel with the platform.

12. A wagon dump comprising a mobile platform adapted to travel in a straight line, a drive shaft supported for rotation about an axis parallel to the direction of travel of the platform, a driving member journaled on the platform and having a sliding drive connection with said shaft, and dumping mechanism carried by said platform and driven from said driving member.

13. A wagon dump comprising a mobile platform adapted to travel in a straight line, a drive shaft supported for rotation about an axis parallel to the direction of travel of the platform, a driving wheel rotatably supported on the platform and having a hub for receiving said drive shaft, said hub and drive shaft being longitudinally slidable relative to each other but having cooperative means to prevent relative rotation therebetween, dumping mechanism carried by said platform, and means for transmitting power from said wheel to drive said dumping mechanism.

14. A wagon dump comprising a pair of laterally spaced parallel rails, a platform having supporting wheels running on said rails, a cradle carried by the platform and movable bodily therewith along the rails, said cradle being adapted to receive the front wheels of a wagon and being movable vertically with respect to the platform between a lowered position adjacent the ground and a raised dumping position, means for locking said platform against movement along the rails when the cradle is in one of said positions, and means responsive to movement of the cradle to another elevation, to disable said locking means.

15. In a device of the class described, the combination of a vehicle lift frame, a lift carried by the frame, two supporting wheels for the frame spaced apart, one in advance of the other, a rail upon which said wheels are mounted, an antitilting device carried by the frame between said wheels to cooperate with the rail to prevent upward movement of the frame relative to the rail, including a rail-gripping member carried by the frame, and means actuated upon by elevating and lowering the lift for clamping or releasing the gripping means automatically to and from the rail when the lift is near its lower position of movement.

LEONARD B. NEIGHBOUR.
FRANK T. COURT.
BEN R. HAVERSTICK.